(12) United States Patent
Hu et al.

(10) Patent No.: US 8,979,346 B2
(45) Date of Patent: Mar. 17, 2015

(54) BACKLIGHT MODULE AND DISPLAY APPARATUS

(71) Applicants: Chechang Hu, Guangdong (CN); Li-Yi Chen, Guangdong (CN); Kuangyao Chang, Guangdong (CN); Yong Fan, Guangdong (CN); Chao Ning, Guangdong (CN)

(72) Inventors: Chechang Hu, Guangdong (CN); Li-Yi Chen, Guangdong (CN); Kuangyao Chang, Guangdong (CN); Yong Fan, Guangdong (CN); Chao Ning, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 166 days.

(21) Appl. No.: 13/703,934

(22) PCT Filed: Nov. 22, 2012

(86) PCT No.: PCT/CN2012/085059
§ 371 (c)(1),
(2) Date: Dec. 13, 2012

(87) PCT Pub. No.: WO2014/067193
PCT Pub. Date: May 8, 2014

(65) Prior Publication Data
US 2014/0185319 A1 Jul. 3, 2014

(30) Foreign Application Priority Data
Nov. 2, 2012 (CN) .................. 2012 1 0433396

(51) Int. Cl.
F21V 7/04 (2006.01)
F21V 8/00 (2006.01)
G02B 6/00 (2006.01)

(52) U.S. Cl.
CPC ............... G02B 6/0028 (2013.01); G02B 6/00 (2013.01)
USPC ............ 362/610; 362/554; 362/557; 362/561

(58) Field of Classification Search
CPC .................. G02B 6/0028; G02F 1/133524
USPC .................................. 362/554, 557, 561, 610
See application file for complete search history.

(56) References Cited

U.S. PATENT DOCUMENTS

| | | | |
|---|---|---|---|
| 2014/0125915 A1* | 5/2014 | Chen et al. | 349/61 |
| 2014/0125919 A1* | 5/2014 | Chen et al. | 349/65 |
| 2014/0125920 A1* | 5/2014 | Hu et al. | 349/65 |
| 2014/0126241 A1* | 5/2014 | Hu et al. | 362/610 |
| 2014/0126242 A1* | 5/2014 | Chen et al. | 362/610 |

* cited by examiner

*Primary Examiner* — Stephen F Husar
(74) *Attorney, Agent, or Firm* — Kirton McConkie; Evan R. Witt

(57) ABSTRACT

The present invention provides a backlight module and a display apparatus. The display apparatus comprises the backlight module and a display panel. The backlight module comprises a light collector, at least one optical fiber, a fiber arrangement substrate and a light guide plate. The optical fiber is connected between the light collector and the fiber arrangement substrate. The light guide plate is disposed at one side of the fiber arrangement substrate. The present invention can use ambient light rays to form a backlight source.

12 Claims, 4 Drawing Sheets

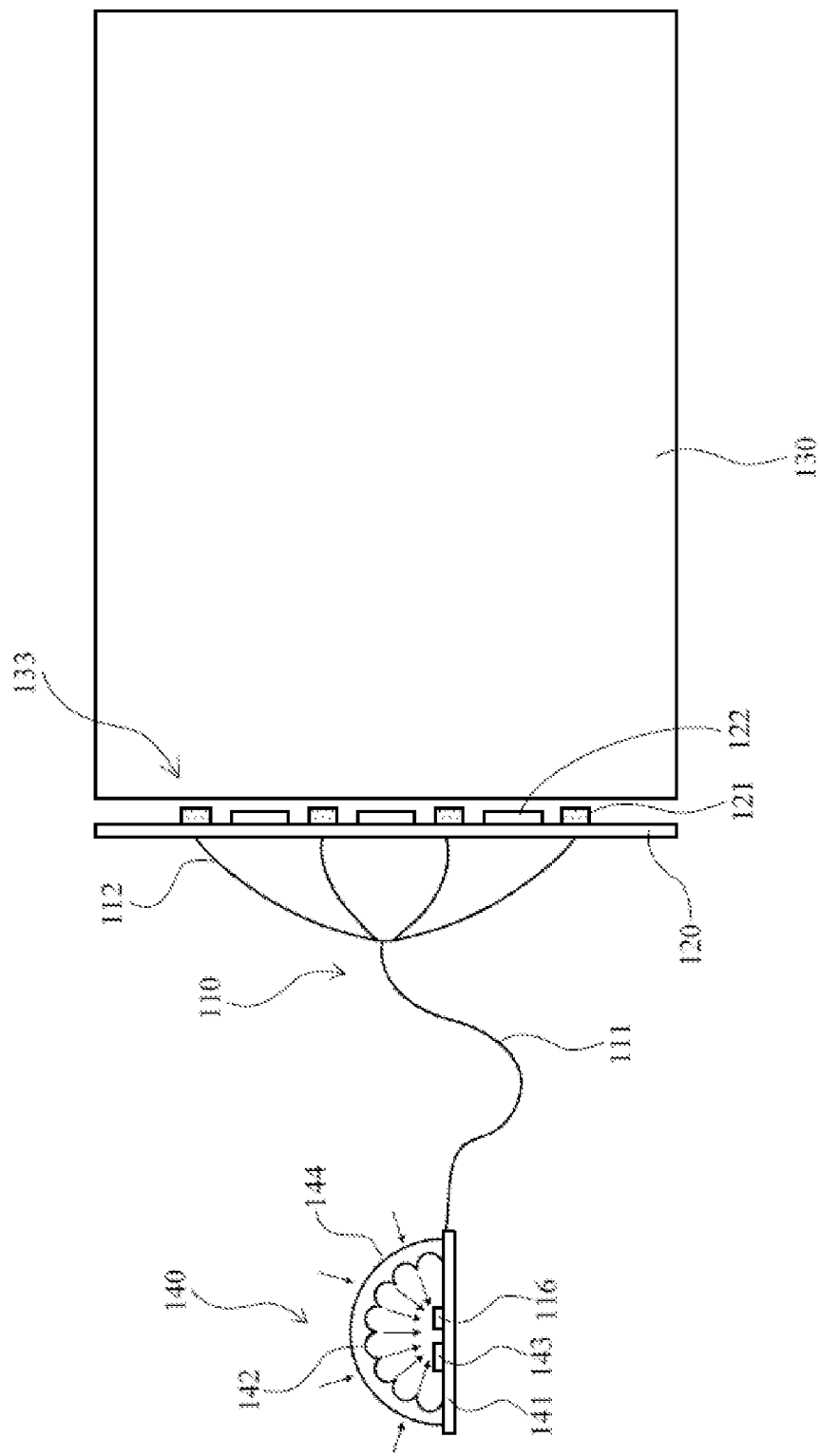

BACKLIGHT MODULE AND DISPLAY APPARATUS

FIELD OF THE INVENTION

The present invention relates to a backlight module and a display apparatus, and more particularly to a backlight module and a display apparatus using ambient light rays.

BACKGROUND OF THE INVENTION

Liquid crystal displays (LCDs) have been widely applied in electrical products. Currently, most LCDs are backlight type LCDs that comprise a liquid crystal display panel and a backlight module. According to the position of the light sources for providing LCDs with backlight, the backlight module can be classified into a side-light type or a direct-light type to provide a backlight for the liquid crystal display panel.

In general, light sources of the backlight module are light emitting diodes (LEDs) or cold cathode fluorescent lamps (CCFLs) which need phosphors to form white light rays which have a poorer color performance and a narrower color gamut, and thus it is difficult to achieve a real color of images. Furthermore, the light sources of the backlight module have a high energy consumption, especially for a large-size LCD.

As a result, it is necessary to provide a backlight module and a display apparatus to solve the problems existing in conventional technologies such as above-mentioned.

SUMMARY OF THE INVENTION

A primary object of the present invention is to provide a backlight module, wherein the backlight module comprises: a light collector configured to collect ambient light rays; at least one optical fiber connected to the light collector; a fiber arrangement substrate connected to the optical fiber, wherein the fiber arrangement substrate includes a plurality of light-outputting openings configured to output the light rays transmitted by the optical fiber; and a light guide plate disposed at one side of the fiber arrangement substrate.

A secondary object of the present invention is to provide a backlight module, wherein the backlight module comprises: a light collector configured to collect ambient light rays; at least one optical fiber connected to the light collector; a fiber arrangement substrate connected to the optical fiber, wherein the fiber arrangement substrate includes a plurality of light-outputting openings configured to output the light rays transmitted by the optical fiber, and an arrangement pitch of the light-outputting openings is equal to or less than 16 mm; and a light guide plate disposed at one side of the fiber arrangement substrate; wherein the light collector includes a base and an optical lens, and the optical lens is disposed on the base, and the optical lens is configured to collect the ambient light and provide the collected light rays to an input end of the optical fiber.

A further object of the present invention is to provide a display apparatus, wherein the display apparatus comprises a display panel and a backlight module. The backlight module comprises: a light collector configured to collect ambient light rays; at least one optical fiber connected to the light collector; a fiber arrangement substrate connected to the optical fiber, wherein the fiber arrangement substrate includes a plurality of light-outputting openings configured to output the light rays transmitted by the optical fiber; and a light guide plate disposed at one side of the fiber arrangement substrate.

In one embodiment of the present invention, the optical fiber comprises a main fiber and a plurality of sub-fibers, and one end of the main fiber is connected to the light collector, and the sub-fibers are connected between the light collector and the fiber arrangement substrate.

In one embodiment of the present invention, the main fiber is formed by bundling the sub-fibers.

In one embodiment of the present invention, an arrangement pitch of the light-outputting openings is equal to or less than 16 mm.

In one embodiment of the present invention, the light collector includes a base and an optical lens, and the optical lens is disposed on the base, and the optical lens is configured to collect the ambient light and provide the collected light rays to an input end of the optical fiber.

In one embodiment of the present invention, the light collector further includes a photo-sensor configured to detect the ambient light for controlling the base to rotate according an ambient light source.

In one embodiment of the present invention, the at least one optical fiber comprises a plurality of optical fibers connected between the light collector and the light-outputting openings of the fiber arrangement substrate.

In one embodiment of the present invention, a diameter of each of the light-outputting openings is equal to or less than 2.5 mm.

In one embodiment of the present invention, the ambient light rays are sunlight rays.

In comparison to the problems existing in the conventional backlight module, the backlight module and the display apparatus of the present invention can use the ambient light rays to form the backlight source, thereby greatly reducing an energy consumption of light sources. Moreover, the ambient light can have a wide color gamut, and thus the display apparatus using the backlight module of the present invention can display images of real color for improving a display quality thereof.

The structure and the technical means adopted by the present invention to achieve the above-mentioned and other objects can be best understood by referring to the following detailed description of the preferred embodiments and the accompanying drawings:

DESCRIPTION OF THE DRAWINGS

FIG. 4 is a schematic diagram showing a backlight module according to another embodiment of the present invention.

DETAILED DESCRIPTION OF THE PREFERRED EMBODIMENTS

Figure 1:
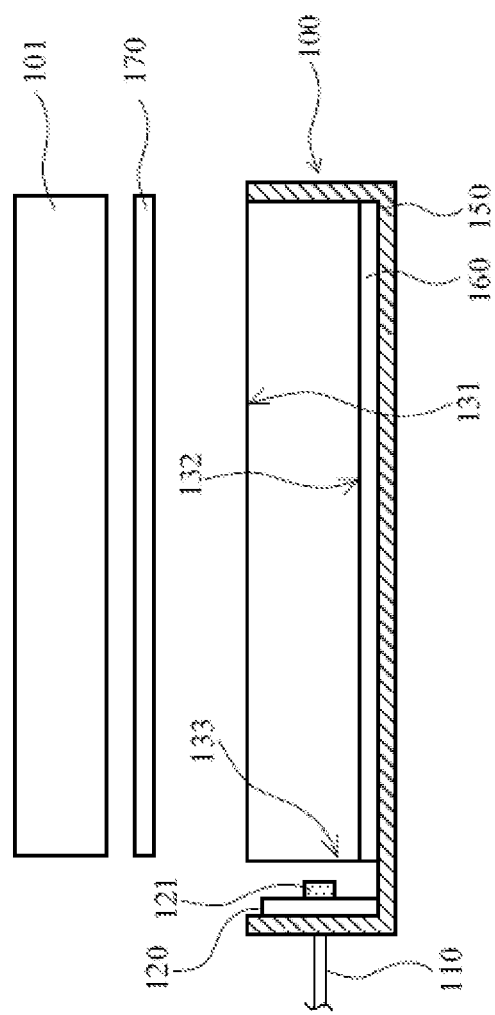
FIG. 1 is a schematic diagram showing a display apparatus according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings are arbitrarily shown for understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It will be understood that, when an element such as a layer, film, region, or substrate is referred to as being "on" another element, it can be directly on the other element or intervening elements may also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top on the basis of a gravity direction.

Figure 2:
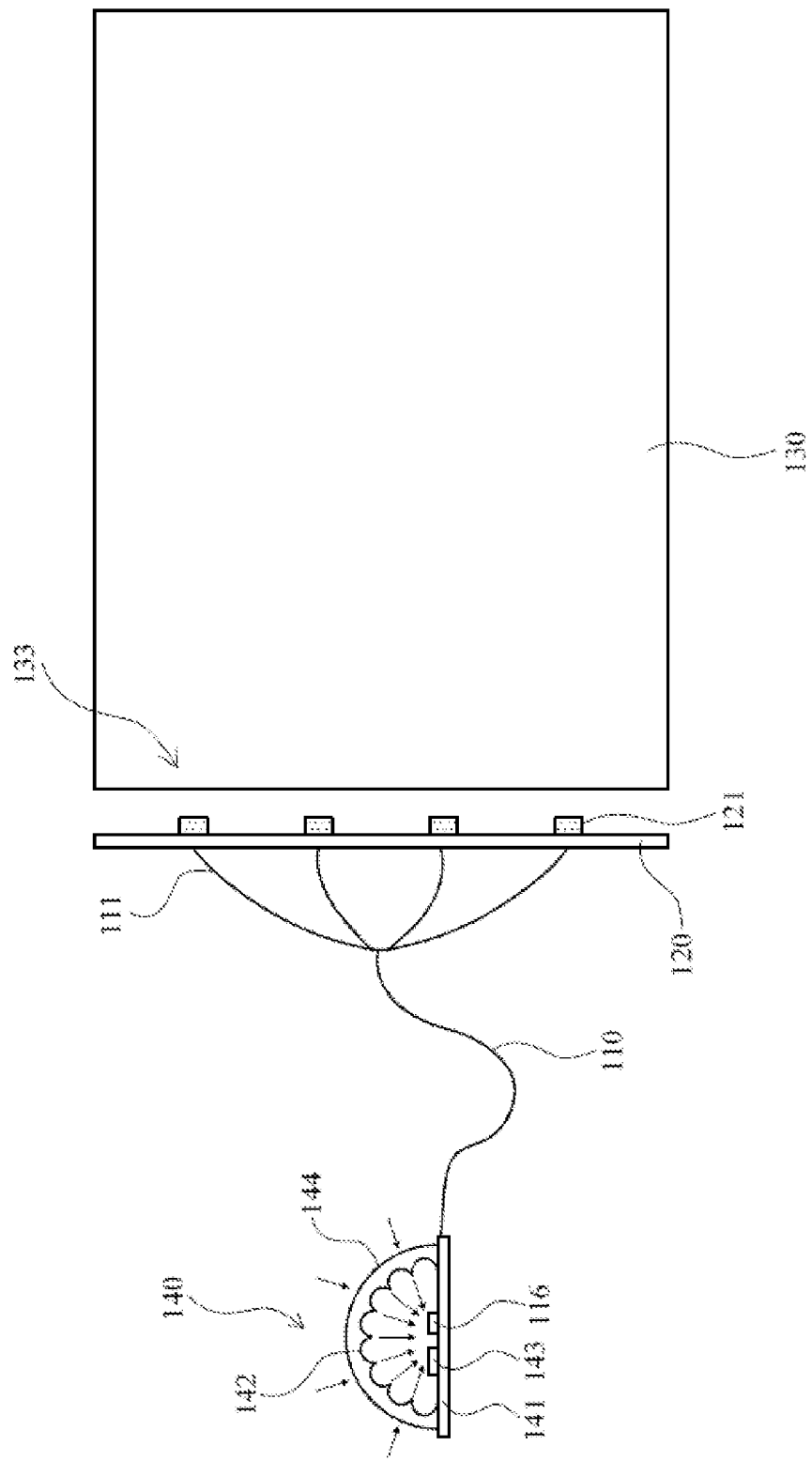
FIG. 2 is a schematic diagram showing a backlight module according to one embodiment of the present invention.

Referring to FIG. 1 and FIG. 2, FIG. 1 is a schematic diagram showing a display apparatus according to one embodiment of the present invention, and FIG. 2 is a schematic diagram showing a backlight module according to one embodiment of the present invention. In the present embodiment, the backlight module 100 is disposed opposite to a display panel 101 (such as a liquid crystal display panel), thereby forming the display apparatus (such as an LCD apparatus). The backlight module 100 comprises at least one optical fiber 110, a fiber arrangement substrate 120, a light guide plate 130, a light collector 140, a back bezel 150, a reflective layer 160 and at least one optical film 170. The optical fiber 110 is connected between the light collector 140 and the fiber arrangement substrate 120 for transmitting light rays. The fiber arrangement substrate 120 is disposed between the optical fiber 110 and the light guide plate 130 for arranging and holding the at least one optical fiber 110, as well as outputting the light rays transmitted by the optical fiber 110 to the light guide plate 130. The light collector 140 is connected to the optical fiber 110 for collecting ambient light rays, such as sunlight or indoor light, so as to provide the light rays for the optical fiber 110. The light guide plate 130 is disposed on the back bezel 150, and the reflective layer 160 is formed between the back bezel 150 and the light guide plate 130 for reflecting the light rays. The optical film 170 is disposed above the light guide plate 130 for optical improvement.

Referring to FIG. 2 again, the optical fiber 110 of the present embodiment can comprise a main fiber 111 and a plurality of sub-fibers 112. The main fiber 111 may be formed by bundling the sub-fibers 112 (i.e. optical fiber bundle), and one end of the main fiber 111 is connected to the light collector 140, and another end thereof is connected to the sub-fibers 112. The sub-fibers 112 may be un-bundled optical fibers connected between the main fiber 111 and light-outputting openings 121 of the fiber arrangement substrate 120. In one embodiment, numerous optical fibers 110 can connected between the light collector 140 and the light-outputting openings 121 of the fiber arrangement substrate 120, respectively, for dispersing the optical fibers.

Figure 3:
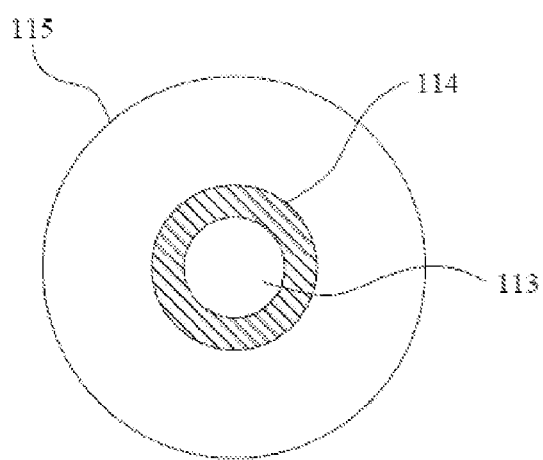
FIG. 3 is a schematic diagram showing the optical fiber according to one embodiment of the present invention.

Referring to FIG. 3, a schematic diagram showing the optical fiber according to one embodiment of the present invention is illustrated. The optical fiber 110 may have a fiber core 113, a cladding layer 114 and a buffer layer 115. The fiber core 113 may be made of silica or PMMA for transmitting the light rays. The cladding layer 114 may be made of a hard polymer for cladding the fiber core 113. The buffer layer 115 may be made of tetrafluoroethene for protecting the optical fiber 110 from damage.

Referring to FIG. 1 and FIG. 2 again, the fiber arrangement substrate 120 is disposed between the optical fiber 110 and the light guide plate 130 for arranging the optical fiber 110. The fiber arrangement substrate 120 comprises the light-outputting openings 121 for exposing the sub-fibers 112 of the optical fiber 110, such that the light rays transmitted by the optical fiber 110 can be outputted by the light-outputting openings 121 of the fiber arrangement substrate 120. In this case, an arrangement pitch of the light-outputting openings 121 may be equal to or less than 16 mm, so as to ensure that the light rays are emitted into the light guide plate 130 dispersedly for forming a uniform plane light source. A diameter (or a width) of each of the light-outputting openings 121 may be equal to or less than 2.5 mm, such that the light rays transmitted by the optical fiber 110 can be entirely outputted by the light-outputting openings 121.

Referring to FIG. 1 again, the light guide plate 130 of the present embodiment is disposed at one side of the fiber arrangement substrate 120. The light guide plate 130 may be made by the method of injection molding, and the material thereof may be photo-curable resin, polymethylmethacrylate (PMMA) or polycarbonate (PC) for guiding the light rays transmitted by the optical fiber 110 toward the liquid crystal display panel 101. The light guide plate 130 includes a light output surface 131, a light reflection surface 132 and a light input side surface 133. The light output surface 131 is formed on one side of the light guide plate 130 and faces to the liquid crystal display panel 101. The light output surface 131 may include a cloudy surface or a plurality of scattering patterns to uniform the light rays outputted from the light guide plate 130, thereby preventing the situation of mura. In another embodiment, the light output surface 131 may include a plurality of protruding structures (not shown) to modify the direction of the light rays, thereby condensing the light rays and enhancing a brightness thereof, wherein the protruding structures may be prism-shaped structures or semicircle-shaped structures. The light reflection surface 132 is formed opposite to the light output surface 131 for reflecting light thereto. In the present embodiment, the light reflection surface 132 of the light guide plate 130 is parallel to the light output surface 131. The light reflection surface 132 may have a plurality of light guiding structures (not shown) formed thereon to guide light to the light output surface 131. The light guiding structures of the light reflection surface 132 may be a continuous V-shaped structure, i.e. V-cut structures, a cloudy surface or scattering patterns, thereby guiding the light rays transmitted by the optical fiber 110 to be outputted from the light output surface 131. The light input side surface 133 may be formed on one side or two opposite sides of the light guide plate 130 and facing the light-outputting openings 121 of the fiber arrangement substrate 120 for allowing the light rays transmitted by the optical fiber 110 to be inputted into the light guide plate 130. The light input side surface 133 may have V-shaped structures (V-cut structures), S-shaped structures or a rough surface structure (not shown) to raise light incidence efficiency and light coupling efficiency.

Referring to FIG. 2 again, the light collector 140 is connected to one end of the optical fiber 110 for collecting the ambient light, such as sunlight. The light collector 140 can include a base 141, an optical lens 142, a photo-sensor 143 and a cover 144. The optical lens 142 and the photo-sensor 143 can be disposed on the base 141. The optical lens 142 is configured to collect the ambient light and provide the collected light rays to an input end 116 of the optical fiber 110. The photo-sensor 143 is configured to detect the ambient light for controlling the base 141 to rotate according an ambient light source, such as sun, thereby improving a light collection efficiency. The cover 144 is configured to encapsulate the optical lens 142 and the photo-sensor 143. Furthermore, the cover 144 may have an ultraviolet ray filter layer (not shown) to filter ultraviolet rays in the ambient light rays.

Referring to FIG. 1 again, in the present embodiment, the back bezel 150 may be made of an opaque material, such as plastic, metal or any combination material thereof for carrying the fiber arrangement substrate 120 and the light guide plate 130, wherein the back bezel 150 may have through holes (not shown) to allow the optical fiber 110 to pass through. The reflective layer 160 (or a reflective sheet) is preferably formed on the light reflection surface 132 of the light guide plate 130, and merely exposes the light input side surface 133 for allowing light to be inputted and the light output surface 131 allowing light to be outputted. The reflective layer 160 may be made of a highly reflective material, such as any combination of alloys Ag, Al, Au, Cr, Cu, In, Ir, Ni, Pt, Re, Rh, Sn, Ta, W, Mn, and a white reflective paint with etiolation-resistant and heat-resistant properties or any combination thereof for reflecting light. The optical film 170 may be a diffuser, a prism sheet, a turning prism sheet, a brightness enhancement film (BEF), a dual brightness enhancement film (DBEF), a diffused reflective polarizer film (DRPF) or any combination thereof disposed above the light guide plate 130 for improving an optical effect of light rays outputted from the light guide plate 130.

When using the backlight module of the present embodiment to provide a backlight source, the optical fiber 110 can transmit the light rays (such as sunlight) collected by the light collector 140 to the light guide plate 130. More specifically, the light rays collected by the light collector 140 can be transmitted by the optical fiber 110, and outputted to the light guide plate 130 from the light-outputting openings 121 of the fiber arrangement substrate 120. The backlight module 100 can use the ambient light to provide the backlight source, thereby greatly reducing an energy consumption of light sources. Moreover, the ambient light can have a wide color gamut, and thus the display apparatus using the backlight module 100 can display images of real color for improving a display quality thereof.

Referring to FIG. 4, a schematic diagram showing a backlight module according to another embodiment of the present invention is illustrated. In another embodiment, the fiber arrangement substrate 120 may comprise a plurality of light sources 122, such as LEDs or organic light emitting diodes (OLEDs). The light sources 122 may be arranged between the light-outputting openings 121 and facing the light input side surface 133 of the light guide plate 130. When the light rays collected by the light collector 140 are not sufficient to provide for forming the plane light source, the light sources 122 can provide additional light rays for the light guide plate 130, so as to ensure that the backlight formed by the backlight module 100 has a sufficient brightness.

As described above, the backlight module and the display apparatus of the present invention can collect the ambient light rays to form the backlight source, thereby greatly reducing an energy consumption of light sources, as well as improving an image color performance and a display quality of the display apparatus.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, comprising:
a light collector configured to collect ambient light rays;
at least one optical fiber connected to the light collector;
a fiber arrangement substrate connected to the optical fiber, wherein the fiber arrangement substrate includes a plurality of light-outputting openings configured to output the light rays transmitted by the optical fiber, and an arrangement pitch of the light-outputting openings is equal to or less than 16 mm; and
a light guide plate disposed at one side of the fiber arrangement substrate;
wherein the light collector includes a base and an optical lens, and the optical lens is disposed on the base, and the optical lens is configured to collect the ambient light and provide the collected light rays to an input end of the optical fiber;
wherein the optical fiber comprises a main fiber and a plurality of sub-fibers, and one end of the main fiber is connected to the light collector, and the sub-fibers are connected between the light collector and the fiber arrangement substrate.

2. The backlight module according to claim 1, wherein the main fiber is formed by bundling the sub-fibers.

3. The backlight module according to claim 1, wherein the light collector further includes a photo-sensor configured to detect the ambient light for controlling the base to rotate according an ambient light source.

4. The backlight module according to claim 1, wherein a diameter of each of the light-outputting openings is equal to or less than 2.5 mm.

5. The backlight module according to claim 1, wherein the ambient light rays are sunlight rays.

6. A backlight module, comprising:
a light collector configured to collect ambient light rays;
at least one optical fiber connected to the light collector;
a fiber arrangement substrate connected to the optical fiber, wherein the fiber arrangement substrate includes a plurality of light-outputting openings configured to output the light rays transmitted by the optical fiber; and
a light guide plate disposed at one side of the fiber arrangement substrate;
wherein the at least one optical fiber comprises a plurality of optical fibers connected between the light collector and the light-outputting openings of the fiber arrangement substrate.

7. The backlight module according to claim 6, wherein an arrangement pitch of the light-outputting openings is equal to or less than 16 mm.

8. The backlight module according to claim 6, wherein the light collector includes a base and an optical lens, and the optical lens is disposed on the base, and the optical lens is configured to collect the ambient light and provide the collected light rays to an input end of the optical fiber.

9. The backlight module according to claim 8, wherein the light collector further includes a photo-sensor configured to detect the ambient light for controlling the base to rotate according an ambient light source.

10. The backlight module according to claim 6, wherein a diameter of each of the light-outputting openings is equal to or less than 2.5 mm.

11. The backlight module according to claim 6, wherein the ambient light rays are sunlight rays.

12. A display apparatus, comprising:
a display panel; and
a backlight module comprising:
- a light collector configured to collect ambient light rays;
- at least one optical fiber connected to the light collector;
- a fiber arrangement substrate connected to the optical fiber, wherein the fiber arrangement substrate includes a plurality of light-outputting openings configured to output the light rays transmitted by the optical fiber; and
- a light guide plate disposed at one side of the fiber arrangement substrate;

wherein the at least one optical fiber comprises a plurality of optical fibers connected between the light collector and the light-outputting openings of the fiber arrangement substrate.

* * * * *